Jan. 10, 1950     B. W. FORSLUND ET AL     2,494,168
PLUG GAUGE
Filed May 20, 1944
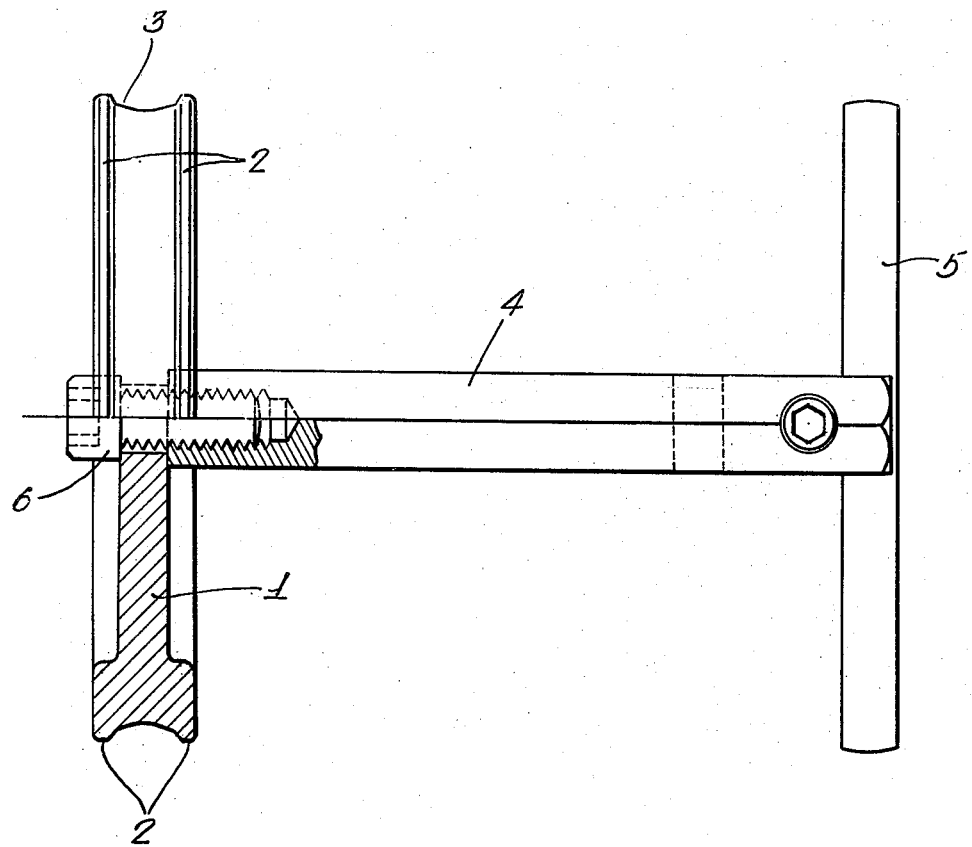
Inventors:
Bror Wilhelm Forslund
Albert Heinrich Robert Christian Hoppe
by their Attorneys
Howson & Howson Patented Jan. 10, 1950

2,494,168

UNITED STATES PATENT OFFICE 2,494,168

PLUG GAUGE

Bror Wilhelm Forslund, Savedalen, and Albert Heinrich Robert Christian Hoppe, Goteborg, Sweden, assignors to SKF Industries, Inc., Philadelphia, Pa., a corporation of Delaware Application May 20, 1944, Serial No. 536,572
In Sweden June 4, 1943

4 Claims. (Cl. 33—178)

The present invention relates to a new plug gage and has for its purpose to provide a gage especially suitable for checking blind holes, but which also has other advantages, for instance which can easily be inserted into the hole and has gaging surfaces so formed that they are easy to adjust and further that the body of the gage is reversible, whereby the useful life of the gage may be prolonged.

One embodiment of the invention is shown in the accompanying drawing.

The gage body 1 is provided with two cylindrical gaging surfaces 2 located near its ends. The gaging surfaces are both of the same diameter and are of comparatively small extension in the axial direction relative to the diameter of the gage. The length of the gaging surfaces is of the magnitude of one half to one and a half or two mm. The gaging surfaces are separated by a peripheral groove 3. The groove 3 serves as a relieving groove and facilitates the insertion of the gage into the hole. The forward and rear edges of the gage body are bevelled or rounded, but the bevels have very small extension in the axial direction, for instance about one half mm. so that the gaging surfaces may be located as near as possible to the ends of the gage to enable the gage to check the diameter of blind holes as near as possible to the bottom of the hole.

When checking very shallow holes only one of the gaging surfaces will come into use.

The gage is then maintained in alignment with the hole by contact between the forward end of the gage body and the bottom of the hole. When checking deeper holes or through-holes the gage is guided by both the gaging surfaces in conjunction. The accuracy of the checking operation in this case is practically as great as can be obtained by means of a gage having a complete cylindrical surface.

When the forward gaging surface, which is the one most subject to wear, begins to be worn, the gage body is disengaged from the handle by loosening the screw 6, which fastens the gage body to the shaft 4 after which the gage body is turned so that the former rear unworn gaging surface is brought to the front of the gage. The gage is then immediately ready for further use without any special adjustment. The gage body can be prevented from turning on the handle by means of ridges (not shown in the drawing) which engage with grooves in the gage body.

On the other end of the handle is an end gage 5 which is attached in a suitable manner to the handle. This end gage is provided for checking the maximum dimension of the hole.

The invention is not limited to the embodiment shown, but may be modified in different ways. The gaging surfaces need not necessarily be cylindrical but may be of a spherical or other suitable form.

Having thus described our invention, we claim and desire to secure by Letters Patent the following:

1. A plug gage having a handle and a gage body attached thereto, said body having a cylindrical gaging surface adjacent each end having an axial width equal to only a small part not exceeding one-tenth of the diameter of said surface, and a peripheral groove terminating at the sides in the respective surfaces and separating the latter.

2. A plug gage according to claim 1 wherein the length of each of said gaging surfaces as measured in the axial direction is of an order of magnitude of one half millimeter.

3. A plug gage having a handle and a gage body attached thereto, said body having a cylindrical gaging surface adjacent each end, having an axial width equal to only a small part not exceeding one-tenth of the diameter of said surface, said surfaces constitute the sole effective gaging surfaces of the gage and having a peripheral groove terminating at the sides in the respective surfaces and separating the latter.

4. A gage comprising a handle and an attached gage body of the plug type adapted for gaging bore diameters, said body having a peripheral groove in the mid section thereof terminating at each side and adjacent the respective ends of the body in a gaging surface, said surfaces being arranged to cooperate in the gaging operation to bring the gage into axial alignment with and in said bore, and each said surface being of such narrow width that the cooperation of both surfaces is required to maintain the gage in said aligned position.

BROR WILHELM FORSLUND.
ALBERT HEINRICH ROBERT
CHRISTIAN HOPPE.

REFERENCES CITED

The following references are of record in the file of this patent:

FOREIGN PATENTS

| Number | Country | Date |
|---|---|---|
| 486,734 | Great Britain | June 9, 1938 |
| 525,358 | Great Britain | Aug. 27, 1940 |
| 544,022 | Great Britain | Mar. 24, 1942 |
| 548,215 | Great Britain | Sept. 30, 1942 |